Nov. 20, 1923.  1,474,650
B. E. STORR
COMBINED RAKE AND ROCK REMOVER
Filed Dec. 1, 1922
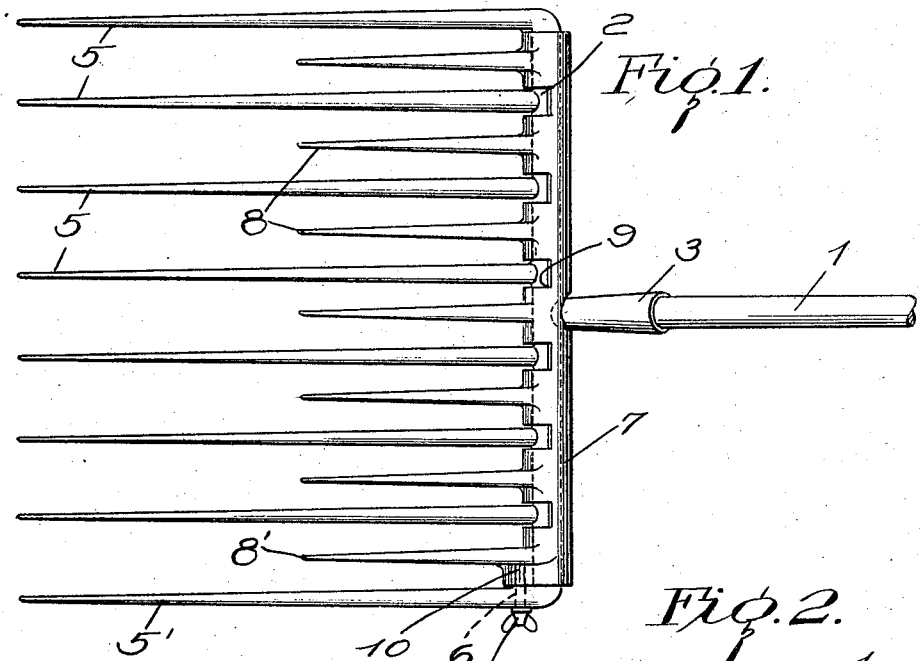
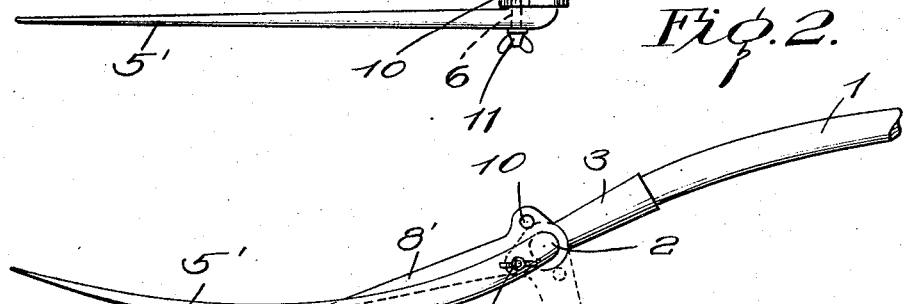
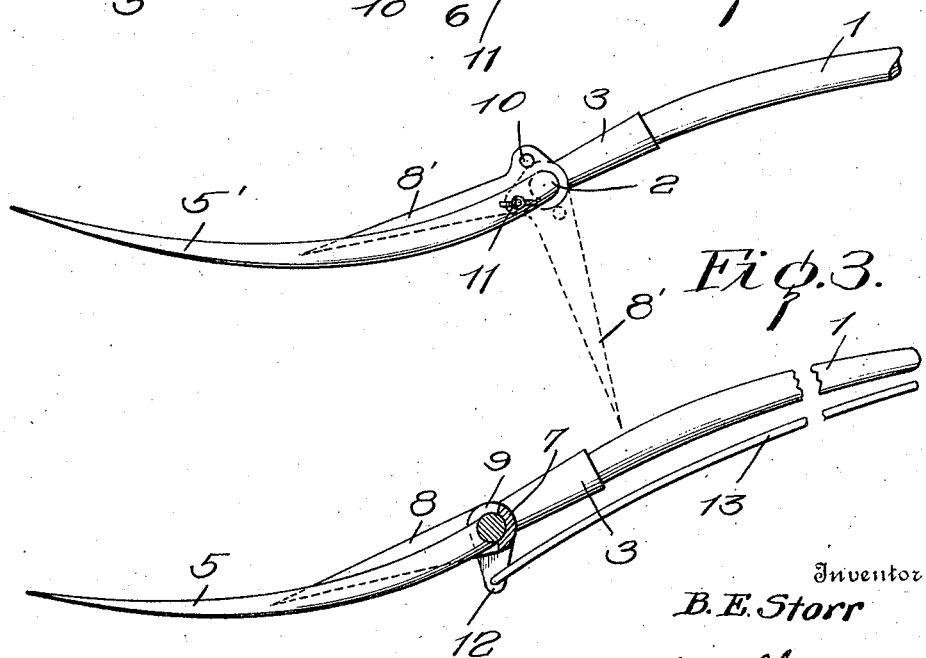
Inventor
B. E. Storr Patented Nov. 20, 1923.

1,474,650

UNITED STATES PATENT OFFICE.

BERT EDWARD STORR, OF BAY VIEW, WASHINGTON.

COMBINED RAKE AND ROCK REMOVER.

Application filed December 1, 1922. Serial No. 604,265.

*To all whom it may concern:*

Be it known that BERT EDWARD STORR, a citizen of the United States, residing at Bay View, in the county of Skagit and State of Washington, has invented certain new and useful Improvements in Combined Rakes and Rock Removers, of which the following is a specification.

This invention relates to a combined rake and fork particularly adapted for raking and removing rocks from the soil and for pitching hay or the like.

The invention comprehends the provision of a fork having movable tines and rigid tines adapted for cooperation in one position of the movable tines to form a complete fork and in another position thereof to form a fork and a rake either of which may be used for the purpose designed. In the first position mentioned the fork is better adapted for pitching hay and the like while in the last mentioned relation the invention is designed for use in raking and removing stones and the like from soil.

A feature of the invention resides in the provision of a simple structure including a handle, a cross-piece mounted on the end of the handle provided with tines, and a sleeve provided with tines mounted on the cross-piece or bar carried by the handle, and adapted for limited rotation thereon, together with a desired means for locking the sleeve in predetermined positions.

Other features of the invention and the details of construction are pointed out in the following description and claims.

In the drawings:

Figure 1 is a plan view of the fork.

Figure 2 is a side elevation showing the movable tines in dotted lines in rake forming position.

Figure 3 is a side elevation of a fork showing a modified form of tine operating means.

1 indicates a handle provided at one end with a cross-bar 2, having a socket 3, extending from the central portion for receiving and securing the cross-bar to the handle. This cross-bar 2 is provided with a plurality of tines 5 rigidly secured thereto and extending in such a relation to the handle that they form a fork. The end tine 5' on the cross-bar is provided with threaded openings 6, for purpose hereafter described.

A sleeve 7 is mounted on the cross-bar 2 for limited rotative movement and is provided with a plurality of tines 8, hereafter designated movable tines adapted to lie between the stationary tines 5 and in the same plane therewith in one position of the sleeve. The sleeve is formed with slots 9, through which project tines 5 and the socket 3 carried by the cross-bar, while the end tine 8' of the movable tines is provided with an opening 10 to receive a bolt 11 which is adapted for threaded cooperation with the openings 6 to lock the movable tines and sleeve in predetermined positions.

In one predetermined position of the movable tines, they lie between the stationary tines as shown in Fig. 1 in the plane of said stationary tines, in which position the fork is adapted for use in pitching hay and the like in an obvious manner, all of the tines cooperating in forking the hay. The movable tines have another position indicated in dotted lines Figure 2, in which position the invention may be used as a rake, the movable tines serving as the rake teeth as they are disposed substantially at right angles to the handle; or as a fork, the stationary tines forming the fork. In this double use of the invention it is obvious that the handle is disposed at a different angle to the ground when the form is being used than when it is used as a rake. The movement of the tines from one position to the other is accomplished, simply by removing the bolt 11 from one of the holes 6 rotating the sleeve a desired amount and placing the bolt in the other opening 6.

In the modified construction shown in Figure 3, the fork and the movable tine structure is the same as above described, while the means for rotating the sleeve to the two positions is different. In this construction a lug 12 extends from the center portion of the sleeve and a rod 13 is pivotally connected to the end of said lug which extends along the underside of the handle 1 as clearly shown.

By operating this rod the sleeve may be rotated for moving the tines 8 into fork forming relation or rake forming position as desired, the rod and the handle being grasped together to hold the movable tines in fixed position in use.

The tine operating structure takes the place of the bolt 11 and provides a more convenient means for rotating the sleeve and movable tines.

What I claim is:—

1. A combined fork and rake, comprising stationary tines forming a fork having a handle extending therefrom, a sleeve mounted for movement with relation to the stationary tines, said sleeve having auxiliary tines operating between the stationary tines, a projection from the sleeve, and a bolt for interlocking said projection with the stationary tines in a plurality of positions, whereby the auxiliary tines may be arranged in a plurality of relations with respect to the stationary tines.

2. A combined fork and rake, comprising a cross bar, stationary tines projecting therefrom in one direction, a sleeve mounted for rotation on the cross bar, auxiliary tines projecting from the sleeve, a lug formed at one terminal of the sleeve and having a plurality of openings adapted to be registered at will with an opening in one of the stationary tines, and a bolt to engage the registering openings, whereby the stationary tines and auxiliary tines may be secured in a plurality of positions.

In testimony whereof I affix my signature.

BERT EDWARD STORR.